April 29, 1958 R. EMANATIAN 2,832,509
VEHICLE FOR DISTRIBUTING SMALL PARTICLE SOLIDS
Filed Jan. 23, 1956 2 Sheets-Sheet 2

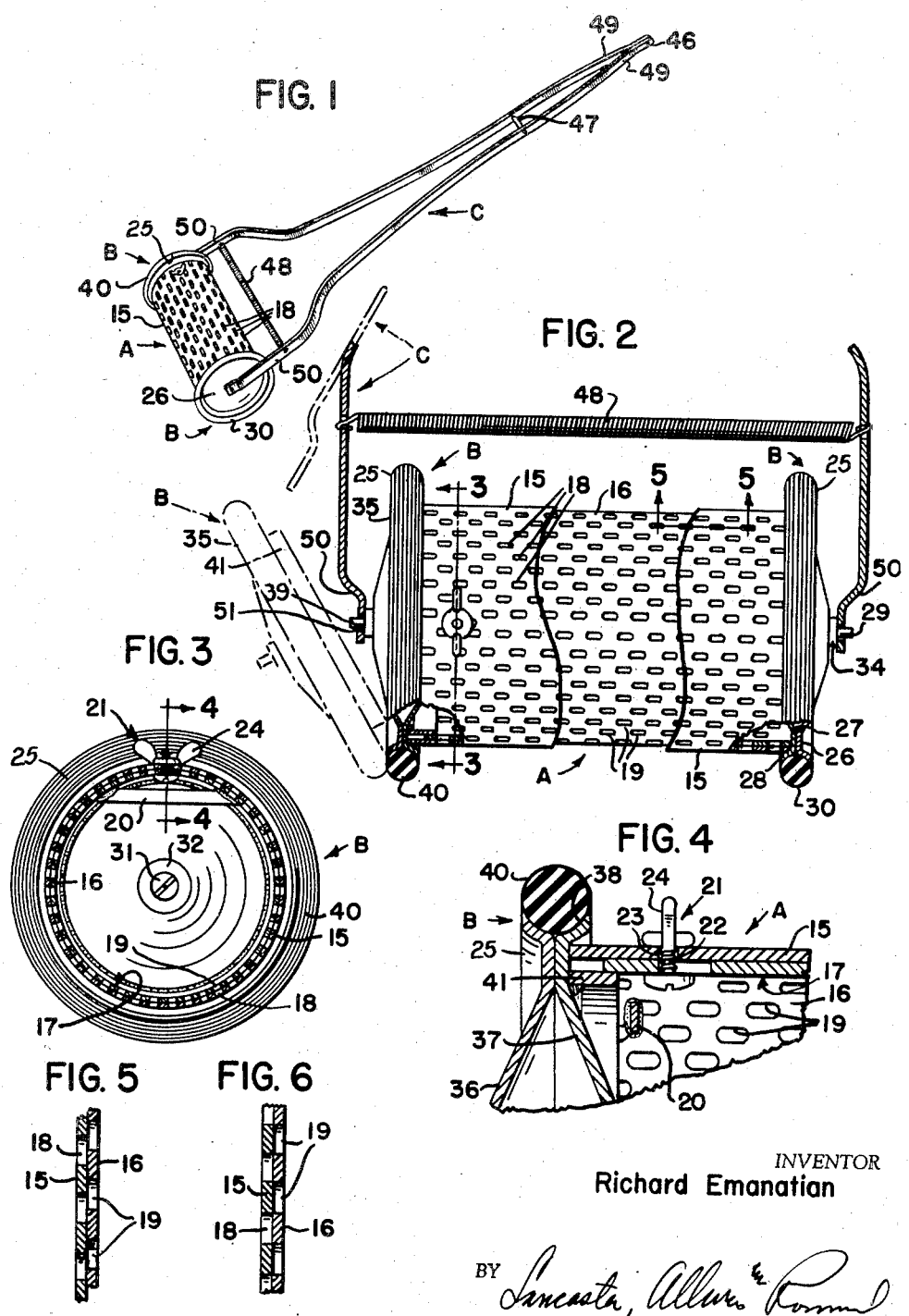

INVENTOR
Richard Emanatian

BY
ATTORNEYS

2,832,509

VEHICLE FOR DISTRIBUTING SMALL PARTICLE SOLIDS

Richard Emanatian, Watertown, N. Y.

Application January 23, 1956, Serial No. 560,789

2 Claims. (Cl. 222—80)

This invention relates to vehicles such as, for example, may be employed for carrying material, such as seed, lime, and other small-particle solids, as fertilizer, insecticides, fungicides and herbicides so that the material may be automatically deposited, as by scattering due to motions of the moving vehicle, upon grass, weeds and other herbage, the ground, thoroughfares and the like.

An important object of the invention is to provide a sturdy, lightweight, collapsible and readily assembled combination of parts for carrying material over an area and depositing it, due to motions of the parts, upon vegetation, the ground and the like.

Another important object is to provide a vehicle as described, having two ground wheels at least one for detachable connection with a tubular container of material to be deposited or scattered, with the wheel retained in proper positions partly by a special detachable handle which is employed for manually pushing, pulling and guiding the vehicle.

Yet another important object is to provide means for frictionally retaining a ground wheel in a detachable relation with a container, this means being within the container but carried by the ground wheel so that the means is not subject to rusting or damage from stones or other obstructions.

Another important object is to provide dual function means to detachably connect two mating portions of ground wheels together, so that a tire may be readily mounted thereon, and also provide pivots to be received by bearings of a handle for the vehicle.

Still another important object is to provide a vehicle as described, portions of which may be adjusted so as to deposit a predetermined quantity of material over a given area, or adjusted so that no material will be deposited, such as when the vehicle is being moved to the area or is charged with the material and in storage.

A further important object is to provide an attachable and detachable mounting means, comprising wheels, for a container of suitable material having a foraminated tubular wall and provided with end portions for engagement by the wheels.

Additionally, an important object is to provide a detachable, collapsible and extensible handle means for association with the vehicle with the handle adapted to be collapsed for storage and the like, and, when extended and in use, will aid in retaining ground wheels in place upon the tubular body of the vehicle.

Another important object is to provide a tubular container for association with detachable wheels for use as described above.

Other objects and advantages of the invention will be apparent during the course of the following detailed description of the invention taken in connection with the accompanying drawings, forming parts of this disclosure, and in which drawings:

Fig. 1 is a perspective view of the vehicle as assembled.

Fig. 2 is a view mostly in elevation of the ground-engaging portions of the vehicle, but with the lower portions of a handle shown in longitudinal section and a ground wheel shown in dotted lines, in a removed position.

Fig. 3 is a transverse section, substantially on the line 3—3 of Fig. 2.

Fig. 4 is an enlarged vertical longitudinal section of one end portion of the vehicle with fragments of a double walled tubular container and a ground wheel in association therewith.

Fig. 5 is a fragmentary sectional view of fragments of the two walls of the double-walled container in one of several related positions.

Fig. 6 is a fragmentary sectional view of fragments of the two walls of the double-walled container in related positions different from those of Fig. 5.

Fig. 7 is an enlarged fragmentary view, mostly in section, of a slight modification of the vehicle of Figs. 1–6 inclusive.

Fig. 8 is a section substantially on the line 8—8 of Fig. 7.

Fig. 9 is a plan view of a handle means for the vehicle as in a collapsed position.

Fig. 10 is a perspective view of a tubular container which may be employed with the mounting of Figs. 11 and 12.

Fig. 11 is a face view of one of the ground wheels of the mounting employed in conjunction with the tubular container of Fig. 10.

Fig. 12 is a view somewhat like that of Fig. 2 with the container of Fig. 10 and two wheels, like the wheel of Fig. 11 in assembled relation and associated with a handle means.

In the drawings, wherein for the purpose of illustration are shown three forms of the invention and wherein similar reference characters designate corresponding parts throughout the several views, the vehicle of Figs. 1 to 6 comprises container means A, mounting means B for the container means A, and handle means C; the vehicle of Figs. 7 and 8 is preferably exactly like the vehicle of Figs. 1 to 6 inclusive except that the container means D differs slightly from the means A; while the vehicle of Figs. 10, 11 and 12, may comprise the container means E, mounting means F for the container means E, and handle means C.

The container means A of the vehicle of Figs. 1 to 6 inclusive is shown as a tubular member preferably of metal or hardened plastic material, having a cylindrical outer wall 15 and a cylindrical inner wall 16 with the walls preferably in face-to-face contact. They define a compartment 17, open at its ends. Each wall is foraminated or provided with a plurality of spaced-apart discharge openings or ports 18 and 19 respectively. These are shown arranged with their longitudinal axes extending longitudinally of the walls 15 and 16 as the case may be, but may be arranged in any suitable arrangement for the discharge of material therethrough, and may be of various conventional shapes such as round or square.

Means to aid in the manual selective rotation of one wall 15 or 16 with respect to the other wall, may comprise the member 20, shown in Figs. 3 and 4, bridging the wall 16 and fixedly secured thereto. This member 20 may be grasped by the hand of an operator, who holds the ground wheel 25, to be subsequently described, in his other hand and rotates one wall while holding the other wall against rotation.

Means to secure the walls 15 and 16 in selected positions, after rotation, one with respect to the other, may be, for example, a conventional wing nut and screw shank assembly 21, shown in Figs. 3 and 4, with the shank 22 extending through a suitable slot 23 extending transversely of the wall containing it, while the shank extends through a suitable perforation in the other wall in alignment with the slot. The wing nut 24 is, of course, loosened in order to permit manual selected rotation of the two cylindrical walls and then retightened. It will be noted that I prefer to position the member 20 closely adjacent the wing nut and screw shank assembly 21, and slot 23, for the member 20 then additionally functions as a brace for the walls 15 and 16, especially the wall 15 weakened by the slot 23, and to resist distortion of the walls 15 and 16 as when the wing nut might encounter an obstruction.

In Figs. 5 and 6 are shown two relative positions of fragments of the walls 15 and 16. Fig. 5 illustrates a partial closing of the discharge ports and Fig. 6 illustrates a complete closing thereof. Of course, it is obvious that the ports may be aligned to afford the maximum port size.

Referring now to the mounting means B, best shown in Figs. 2 and 4, the same includes the ground wheel 25 which comprises a wall which may be made up of two metallic or hardened plastic discs 26 and 27 the outer disc 26 preferably being outwardly convex and the inner disc 27 being also preferably outwardly convex with the edge portions of the discs preferably formed into a channel or rim 28 as is clear in Fig. 4. A portion of the inner disc 27 secured to the edge portion of the cylindrical outer wall 15 as by being soldered or welded thereto. The outer disc 26 is provided with a handle-engaging pivot or stub axle means, as the outwardly-extending projection 29 at substantially the axial center of the disc. The channel or rim 28 may accommodate a tire 30.

The handle engaging pivot or stub axle means is preferably common to all forms of the invention and best shown in Fig. 12. It has dual functions and preferably comprises a bolt assembly with the slotted head 31 disposed in a recess 32 in the inner disc at the axial central portion thereof and a shank 33 screw threaded intermediate its ends to extend through suitable aligning openings in the discs and outwardly of the outer disc. The screw threads extend outwardly of the outer disc in order to accommodate a nut 34 but the extremity of the shank 33 is circular in order to provide the projection for being engaged by the handle means to be described. With this construction the two discs may be separated for the purpose of replacing a worn tire, for example.

The mounting means B also includes the ground wheel 35, which is removable but otherwise much like the wheel 25, since it comprises a wall, preferably made up of two discs 36 and 37 like the discs 26 and 27 and similarly secured together, and may be formed to provide a channel or rim 38, while the disc 36 is provided with a projection 39 functioning as does the projection 29, and the channel or rim 38 may accommodate a tire 40. However, the inner disc 37 has an annular flange 41 secured to its face which fronts the inner disc 27 and is spaced from the periphery and axis of rotation of the ground wheel 35. This flange is adapted to extend into the cylindrical inner wall 16 to have a fit with the adjacent inner edge portion of the cylindrical inner wall 16.

It will be noted that each wheel 25 and 35 has a diameter greater than the outer diameter of the cylindrical outer wall 15 and, as shown in Figs. 3 and 4, the wing nut 24 will not interfere with rotation of the container means A upon the mounting means B.

The mounting means B provide, in addition to their mounting functions, the closures for the container A. The ground wheel 35 is adapted to be removed when charging the container means A and is then replaced.

Referring now mainly to Figs. 9, 2 and 12, the handle means C comprises a collapsible and extensible detachable bifurcated handle structure preferably made up of two elongated handle portions 45, means 46 connecting the upper end parts of the handle portions, means 47 separating the two handle portions, and means 48 for resiliently urging the two handle portions toward each other.

The elongated handle portions 45 are preferably alike, each of springy material, as steel, having an upper end part 49 which preferably is in face contact with the like part of the other handle portion and they are then connected together by the means 46, which may be solder or a weld. From these end parts 49, the handle portions diverge slightly and, spaced nearer the parts 49 than the opposite or lower end parts 50, they are joined by the means 47, which may be a short cylindrical member bridging the portions 45 and rigidly secured thereto as by bolts, solder or welding. For example, for a handle portion 45, substantially forty inches long, the cylindrical member may be less than one-and-one-half inches. From the means 47, the portions continue to normally diverge and, at the upper ends of the lower end parts 50, they diverge more abruptly. At the lower ends of the lower end parts 50 the handle portions 45 are provided with means to detachably secure the portions 45 to the projection members 29 and 39 and provide bearings therefor. Preferably, these are produced by perforating the lower end parts to provide circular openings 51 to accommodate the projections mentioned. Preferably, these lower end parts 49 are also provided with the means 48 which may be a retraction helical spring, with its end convolutions secured to the portions 45 as by being hooked into suitable perforations in the parts 50. For example, with the convolutions of the spring touching, the spring may have a length of substantially six inches, but the spring being capable of extension to eight to twelve inches. This specific handle means C may be collapsed to provide a very narrow structure as for packaging, with the extremities of the lower end parts thereof in contact. In such positions, the two portions 45 may be but two-and-one-quarter inches apart. However, when the spring is extended and the projections 29 and 39 are within the openings 51, the spring tends to urge the lower parts so well in contact with the ground wheels that the wheel 35 will not become accidently separated from the rest of the vehicle.

Referring now to Figs. 7 and 8, the form of the vehicle illustrated therein differs from the form of Figs. 1 to 6 inclusive only in the shape of the discharge openings 58 and 59 in the cylindrical outer and inner walls 55 and 56 respectively, for these openings have their longitudinal axes normal to the axis of rotation of the container means D.

I may prefer to provide the container means E of Fig. 10 as a sales item for employment until the contents is used up and the container means E may then be discarded for another of the same means. Preferably, the container means E is a tubular container which includes a tubular wall 60 of inexpensive material, such as cardboard, for containing material as that previously mentioned, to be dispersed. The wall 60 is provided with a plurality of spaced-apart material-discharge openings or ports 61 and the end portions 62 of the tubular container includes end walls 63 with at least a part of these end walls being of material readily penetrated as by a plurality of rigid projection members or prongs 72 to be subsequently described. The end walls may be of cardboard, and provided with indicia, as the arcs of circles 64 to guide the operator in properly attaching the mounting means F thereupon. In order to prevent the material within the container from accidently dropping through the discharge openings or ports 61, I may provide a removable sleeve 65 about the wall 60 secured in place as by an adhesive pull-strip 66 extending longitudinally of the container at the overlapping edge portions of the sleeve.

The mounting means F for the tubular container means E are two substantially similar ground wheels 70, somewhat like the ground wheels heretofore described. However, as may be seen in Fig. 12, the inner disc 71 thereof of one of the pair of ground wheels 70 is provided with a plurality of axially-extending rigid projection members or prongs 72 and these are spaced from the periphery and axis of rotation of the wheel. The projection members 72 are adapted for insertion into the end walls 63, being guided by the indicia thereon to extend into the interior of the container of the container means E. Thus the ground wheels may be frictionally secured to the container means E and will be additionally retained against accidental separation therefrom by the spring-biased handle means C described.

The flange member 41 and projection members 72 each provide friction means for frictionally engaging the respective containers for detachable connection therewith of the detachable ground wheels of the three forms. I have discovered that a flange is best housed within the container, against the inner face thereof because it will not become bent as would an exterior flange when striking stones or other obstructions. Moreover, it is protected from moisture and is less apt to become corroded and adhere to the container wall and the flange is well raised from the ground surface such as when wet, for only the tires 40 engage that surface.

The dual function bolt assemblies 31 to 34 permit very ready mounting of the vehicle tires of all forms of the invention in addition to their function as axles carried in the bearings at the lower end portions of the handle C.

Since the handle C must, of necessity, be elongated since it is adapted to be grasped at its upper end by an operator while the lower end is connected with the ground wheels, I do not desire the upper ends of the handle portions to become greatly bowed, yet the lower portions must spread considerably. For this reason I provide the means 47 separating the two handle portions. This means, represented by the narrow bridge, affords a horizontal handle portion for grasping by the hand not engaged with the upper end of the handle, so as to better guide the vehicles about. The collapsible handle C may be packaged into an elongated slender package.

Various changes may be made to the forms of the invention herein shown and described without departing from the spirit of the invention or scope of the following claims.

What is claimed is:

1. A vehicle mounting for a tubular container for material such as fertilizer and the like, in which said tubular container has a plurality of material discharge openings in its tubular wall with one end portion of said tubular container including an end wall with at least a part of said end wall being of material readily penetrated by a rigid projection, said mounting including a wheel, means carried by said wheel for detachably mounting said wheel upon the other end portion of said tubular container, a second wheel having an inner face, and means carried by said second wheel for detachably mounting said second wheel upon said one end portion of said tubular container, comprising a rigid projection extending from said inner face and spaced from both the periphery and the axis of rotation of said second wheel, for insertion into said material of said end wall.

2. A vehicle for conveying material, such as seeds, lime and small particle fertilizer and insecticides, and automatically depositing said material upon a surface, said vehicle including a rotatable substantially horizontally disposed tubular container for said material and provided with a plurality of material discharge openings, and mounting means for said container, including ground wheels, one of said ground wheels including connecting means for engaging said container for detachable connection therewith, said connecting means including a prong portion extending outwardly from said one of said ground wheels and in engagement with said container and spaced from the periphery and axis of rotation of said one of said ground wheels.

References Cited in the file of this patent
UNITED STATES PATENTS

| | | |
|---|---|---|
| 164,562 | Hughes | June 14, 1875 |
| 313,015 | Nobles | Feb. 24, 1885 |
| 335,959 | Ratliff | Feb. 9, 1886 |
| 344,887 | Wentz | July 6, 1886 |
| 828,504 | Rapp | Aug. 14, 1906 |
| 1,669,223 | White | May 8, 1928 |
| 1,849,159 | Torrence | Mar. 15, 1932 |
| 1,862,347 | Hawks | June 7, 1932 |
| 1,925,809 | Masters | Sept. 5, 1933 |
| 2,196,117 | Lange | Apr. 2, 1940 |

FOREIGN PATENTS

| | | |
|---|---|---|
| 26,929 | Great Britain | Nov. 19, 1910 |